US012670770B1

(12) United States Patent
Akhtar et al.

(10) Patent No.: US 12,670,770 B1
(45) Date of Patent: Jun. 30, 2026

(54) TECHNOLOGIES FOR DYNAMICALLY GENERATING NARRATIVE CONTENT AND STRUCTURES IN AN ONLINE SPORTSBOOK PLATFORM

(71) Applicant: DK CROWN HOLDINGS INC., Boston, MA (US)

(72) Inventors: Saleem Akhtar, London (GB); Rohan Shanker, London (GB); Henry Charles Maurice Turner, London (GB); Luke Redman, Boston, MA (US); Ravi Manubhai Patel, Hillsborough, NJ (US)

(73) Assignee: DK CROWN HOLDINGS INC., Boston, MA (US)

( * ) Notice: Subject to any disclaimer, the term of this patent is extended or adjusted under 35 U.S.C. 154(b) by 0 days.

(21) Appl. No.: 19/353,768

(22) Filed: Oct. 9, 2025

(51) Int. Cl.
*G07F 17/32* (2006.01)
*G06F 9/451* (2018.01)

(52) U.S. Cl.
CPC ........ *G07F 17/3288* (2013.01); *G07F 17/323* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2010/0205255 A1* | 8/2010 | Alderucci | G07F 17/323 |
| | | | 709/206 |
| 2017/0001122 A1* | 1/2017 | Leung | A63F 13/355 |
| 2020/0133452 A1* | 4/2020 | Gupta | G06N 20/00 |
| 2020/0342718 A1* | 10/2020 | Juan | G06Q 50/34 |
| 2021/0217278 A1* | 7/2021 | Huke | G07F 17/323 |
| 2021/0256650 A1* | 8/2021 | Huke | G06N 5/04 |
| 2022/0180699 A1* | 6/2022 | Huke | G07F 17/3288 |
| 2023/0065776 A1* | 3/2023 | Juan | G06F 40/56 |
| 2024/0284014 A1* | 8/2024 | Azuolas | H04N 21/47805 |
| 2025/0252811 A1* | 8/2025 | Marko | G06Q 10/0639 |

* cited by examiner

*Primary Examiner* — Tramar Harper
(74) *Attorney, Agent, or Firm* — Barnes & Thornburg LLP

(57) ABSTRACT

Technologies for dynamically generating narrative content data and structures include a system that collects text-based data associated with a bettable event from data sources. The system identifies, based on an analysis of the collected text-based data using one or more artificial intelligence and machine learning (AI/ML) models, one or more narrative elements in the collected data. The system generates, using the AI/ML models, one or more narrative content objects incorporating the identified narrative elements and maps each of the one or more narrative content objects to a bet type object for an online sportsbook platform. The system updates and remaps the narrative content objects in real-time while the bettable event is occurring.

18 Claims, 8 Drawing Sheets

400

504

Game Type
  Pre-live
  Live

Fixture
  Select
  Fixture
  [New York @ Detroit ⌄]

Data Sources
  [☑] News Articles
  [☑] Social Media
  [☑] Team Stats
  [<]  [ ]  [>]

Data Time Window
  [7] day(s)

[ Generate Bets ]

Source Data   Narratives   SGPs

Source Data

Team Stats   News Articles   Social Media

Detroit Recent Form
  (W) (W) (W)

New York Recent Form
  (L) (W) (W)

Head-to-Head Results
  DET   7-3   (2025-07-21 | @ DET)   NY
  DET   4-5   (2025-07-20 | @ DET)   NY
  NY    2-6   (2025-06-30 | @ NY)    DET US Conference Central

| TEAM | W | L | RANK | GB |
|------|---|---|------|-----|
| Detroit | 5 | 4 | – | 0.0 |
| St. Charles | 4 | 5 | 5 | 1.0 |
| Cleveland | 3 | 6 | 9 | 2.0 |
| Mankato | 3 | 6 | 10 | 2.0 |
| Chicago | 2 | 7 | 12 | 3.0 |

TECHNOLOGIES FOR DYNAMICALLY GENERATING NARRATIVE CONTENT AND STRUCTURES IN AN ONLINE SPORTSBOOK PLATFORM

FIELD

The present application generally relates to content management, and more specifically to dynamically generating narrative content and structures in an online sportsbook platform.

BACKGROUND

Online sportsbook platforms allow users to place bets on various sporting events on a client device via an application that provides a user interface for the platform. One example of bets includes parlay betting, which pertains to a single wager that combines two or more individual bets, or "legs," into one bet. To win a parlay, each leg must be successful. An online sportsbook platform generally provides a computing architecture that generates simulations for different scenarios that may potentially occur in a given event (e.g., a sports match between two teams) and estimates odds relating to each scenario, which may then be distributed to the appropriate processes for ultimately presenting parlay options to a client-side application on a device of the bettor user.

Although parlay betting traditionally has involved legs over multiple events, modern sportsbooks platforms provide functionality to allow a user to place parlay bets in a single event (also referred to herein as same game parlays (SGPs)). For example, for a given event, a bettor user may select a particular team will win the game, that a given player will score over a minimum number of points, and that the combined score between both teams is over or under a certain number of points. Because such legs being satisfied in a single game rely on significant statistical correlations and potentially lead to greater returns, SGPs are typically a source of high user engagement on sportsbook platforms.

SUMMARY

One embodiment presented herein discloses a system that includes one or more processors and a memory storing instructions. The system, when the instructions are executed on the one or more processors, collects text-based data associated with a bettable event from data sources. The system identifies, based on an analysis of the collected text-based data using one or more artificial intelligence and machine learning (AI/ML) models, one or more narrative elements in the collected data. The system generates, using the AI/ML models, one or more narrative content objects incorporating the identified narrative elements and maps each of the one or more narrative content objects to a bet type object for an online sportsbook platform. The system receives, while the bettable event is occurring, additional text-based data associated with the bettable event from the data sources and identifies, using the one or more AI/ML models, one or more updates to the incorporated narrative elements. The system modifies, while the bettable event is occurring, the narrative content objects based on the one or more updates to the incorporated narrative elements.

Another embodiment presented herein discloses a method. The method generally includes collecting, by execution of one or more processors, text-based data associated with a bettable event from data sources. Based on an analysis of the collected text-based data using AI/ML models, one or more narrative elements in the collected data is identified. Using the one or more AI/ML models, one or more narrative content objects incorporating the identified narrative elements is generated and mapped to a bet type object for an online sportsbook platform. The method also generally includes receiving, while the bettable event is occurring, additional text-based data associated with the bettable event. One or more updates to the incorporated narrative elements are identified based on an analysis of the additional text-based data using the one or more AI/ML models. The narrative content objects are modified based on the updates.

BRIEF DESCRIPTION OF THE DRAWINGS

The foregoing aspects and other features of the disclosure are explained in the following description, taken in connection with the accompanying example drawings relating to one or more embodiments.

FIGS. 5A-5C illustrates an example user interface for generating one or more narrative content and structures for a given event, according to an embodiment.

DETAILED DESCRIPTION

Figure 1:
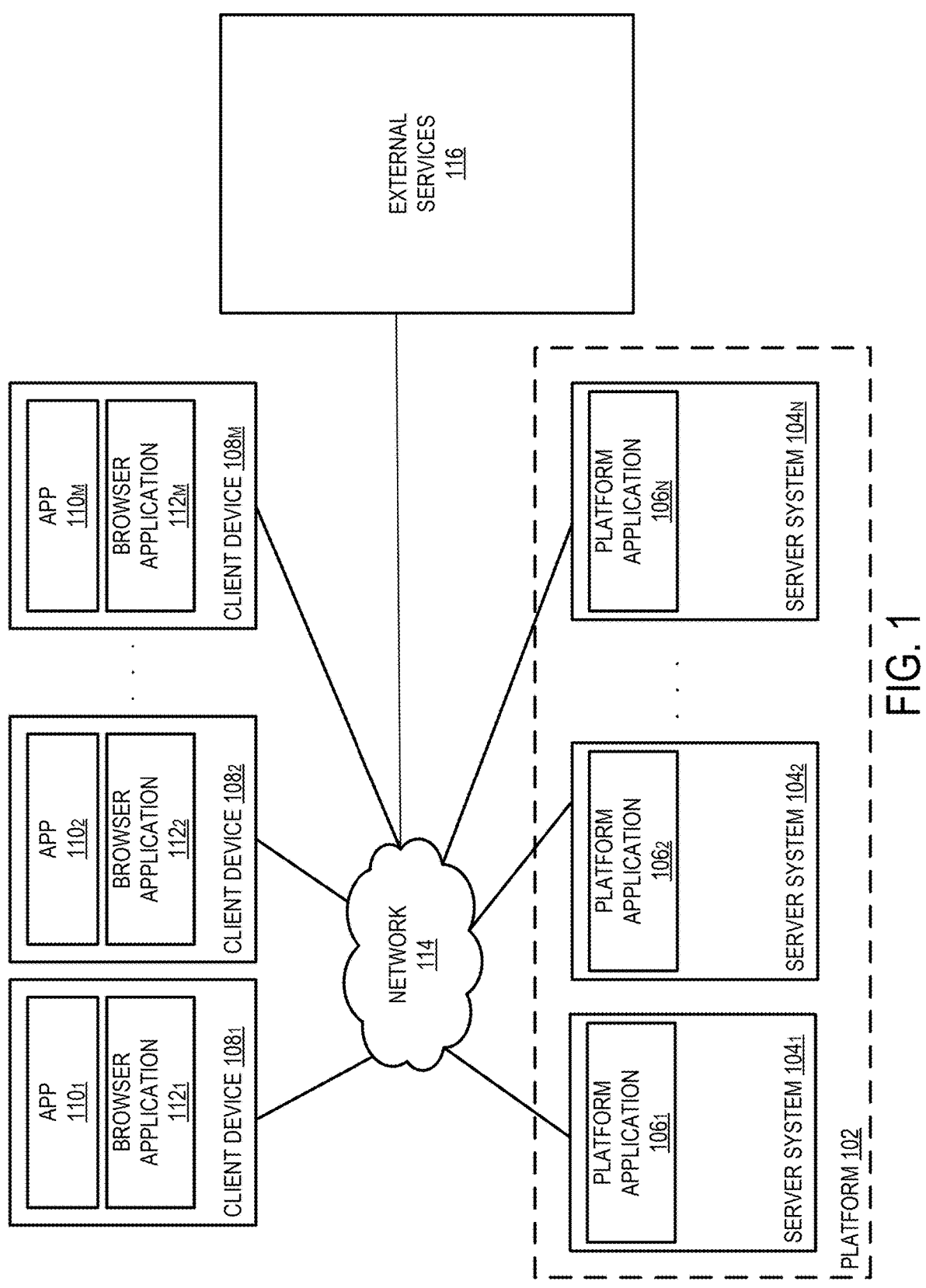
FIG. 1 illustrates an example computing environment of an online sportsbook platform configured to generate narrative content and structures associated with an event object, according to an embodiment.

Online sportsbook platforms often provide narrative content surrounding bettable events to drive user engagement. Narratives that frame actionable information for a given event in an interesting manner, such as highlighting the momentum of a sports team over the last several games or describing the dynamics between rival opponents facing off in a boxing match, can increase user engagement and betting activity on the platform. Online sportsbook platforms typically provide software that enables creation of narrative content to associate with a bettable event. For example, narrative content data is often tied to a same game parlay (SGP) event object which itself may include core event information, market and wager components, parlay-specific data, and live data. The narrative content may be pushed to a client-side application of the platform for display to a user, who can determine whether to engage with the underlying SGP.

Typical approaches for generating narrative content data involve static and pre-defined templates for "content cards," which often require manual or automated (e.g., via script) input of event data and betting odds for a given event. Once input, the platform may generate a content card from the input which can then be associated with the event and availed to client-side applications. However, such processes can be time- and resource-intensive by requiring data being separately pulled from different sources (e.g., platform Application Programming Interfaces (APIs) for accessing simulator odds, event data, etc.) and being entered into the template. Such processes are especially inefficient for live events, in which on-going event statistics influence betting outcomes and odds in parlay bets (including SGPs), which in turn often require narrative changes within a narrow time window on the platform, thus making template-based and manual processes highly impractical, as new narratives may be rendered obsolete within minutes or even seconds.

Embodiments presented herein disclose improved technologies for dynamically generating narrative content data and structures to associate with a bettable event or series of bettable events on an online sportsbook platform. The disclosed technologies provide an artificial intelligence and machine learning (AI/ML)-based approach to consume relevant information from various internal and external sources (e.g., platform APIs, social media, news outlets, and so on) and analyze public sentiment leading up to and during a given event. The information and analyses may be input to an AI/ML-based narrative engine, which extracts and/or generates storylines which can then be ranked to identify storyline angles that are potentially compelling to users of the online sportsbook platform based on trained learning models. The disclosed technologies may also further incorporate the current event script and real-time sentiment to shape narrative output. Doing so allows to the platform to react to events as they occur.

Further, the disclosed technology may link generated narratives to data objects managed by the online sportsbook platforms. One example includes mapping narrative content generated according to the disclosed technology to bet type objects on the sportsbook platform, such as bet type objects to correspond to SGPs or any other types of bets (e.g., parlay bets over multiple events, individual bets like moneyline, point spread, total, player prop, and the like). The mappings provide an efficient means for the platform to retrieve the bet type data objects and associated narratives for transmission to a client-side application. Advantageously, the disclosed technology enables fast generation of narrative content associated with an event that is potentially compelling to a user of the platform leading up to and during the event, which consequently provides scalability to allow the platform to generate narratives for multiple contemporaneously occurring events, reducing the need for manual intervention.

Note, the present disclosure uses an online sportsbook platform as a reference example of a software computing environment that generates narrative content data and structures associated with an event. Of course, one of skill in the art will recognize that the embodiments disclosed herein may be adapted to a variety of other software platforms to generate narrative content associated with identifiable events, such as news content media platforms, live streaming platforms, financial investment platforms, and so on.

Referring now to FIG. 1, an example computing environment 100 is provided. As shown, the computing environment 100 includes a platform 102 which includes server systems 104$_{1-N}$. The computing environment 100 further includes client devices 108$_{1-M}$. Each of the server systems 104, client devices 108, and external services 116 are interconnected via a network 114, such as the Internet.

In an embodiment, the server systems 104 of the platform 102 relate to computing resources used to provide a sports entertainment and gaming platform executing one or more services, such as an online sportsbook service, fantasy sports service, casino service, and the like. The services may execute via one or more platform applications 106$_{1-N}$. A server system 104 may be embodied as a physical computing system or a virtual computing instance executing in a cloud environment. The server systems 104 may be physically and/or logically grouped to provide the one or more services via the platform applications 106$_{1-N}$.

A client device 108 may be embodied as a physical computing system (e.g., a desktop computer, laptop computer, mobile device such as a smartphone or tablet, etc.) or a virtual computing instance executing on a cloud provider network. Client devices 108$_{1-M}$ may access the platform applications 106$_{1-N}$ through a variety of means, such as through a platform-specific app 110 or through a web interface rendered in a browser application 112. The app 110 (or the web interface) provides access to a sportsbook service to a user of the platform (provided by the platform applications 106$_{1-N}$), enabling the user to place bets on various bettable events through a graphical user interface (GUI).

As used herein, the term "bettable event" refers broadly to any occurrence, condition, or outcome, whether real-world or virtual, upon which a wager, prediction, or contingent stake may be placed. A bettable event may include, without limitation, a sporting event, competition, contest, match, or any sub-portion thereof such as a play, drive, inning, possession, or individual performance. A bettable event may also relate to a non-sporting occurrence such as an election, award outcome, entertainment result, financial market movement, or weather condition. A bettable event may also encompass a simulated or computer-generated occurrence, including outcomes associated with video games, esports, virtual reality environments, or algorithmically generated scenarios. In other embodiments, a bettable event may be a system-generated or user-defined condition derived from data feeds, statistical models, or rules, such as whether a threshold is exceeded, a combination of outcomes occurs, or a particular sequence of conditions are satisfied. A bettable event may also be referred to as a wagerable event, betting opportunity, wagering opportunity, prediction target, contest outcome, or stakeable occurrence. Bettable events may be atomic (a single occurrence), composite (a combination of sub-events), conditional (dependent on other events), or derived (abstracted from underlying data). The scope of a bettable event may extend to both discrete events and continuous conditions, whether anticipated, simulated, modeled, user-defined, or platform-defined.

The GUI of the app 110 (or web interface) provides multiple layers of functionality that allows users to browse, evaluate, and place wagers for one or more available and bettable events. For instance, the user may, via the GUI of the app 110 (or web interface), place a moneyline or spread bet on an outcome of a football game taking place on a given date. As another example, the user may place a parlay bet on a number of outcomes occurring across multiple sporting events. As yet another example, the user may place a same game parlay (SGP) on a number of outcomes occurring over a single sporting event. For a given SGP, the GUI may display event context information (e.g., teams or players, league information, scheduled start time, live/in-play status), match details (e.g., venue, weather, key stats, etc.), live scoreboard information, parlay leg details (e.g., odds for each leg, status, etc.), aggregate bet information (combined odds, stake input, potential payout, etc.), bet controls (e.g., bet slip review, confirmation state, cash out options if applicable), tracking information, and the like.

Further, the app 110 may also provide social media functions such as a user feed to allow users to interact with one another regarding sports events and share betting activity. Example social media functions can include bet sharing to third-party social media services, activity feeds, community aggregate bet picks, leaderboards, peer-to-peer interactions, third-party content integration, engagement mechanics (e.g., likes, comments, reactions, gamification objects, etc.), and so on.

The platform applications 106$_{1-N}$ provide content through various services interfacing with the client devices 108, such as sports data APIs providing live sports event information, historical sports event information, statistics, odds, etc.; cashout APIs providing eligibility assessment conditions data, offer generation data, settlement data, etc.; social media APIs providing content sharing functions, social media network integration functions, user data, etc.; marketing APIs providing affiliate integration functions, marketing campaign tracking functions, campaign generation functions, etc.; and bet reporting APIs providing bet tracking data, historical bet data, live odds data, etc. Other messaging protocols may be contemplated. In an embodiment, the platform applications 106$_{1-N}$ may also provide APIs providing internal-facing user interfaces accessible by, e.g., by an administrator, operator, developer, and the like for managing the platform 102. The user interfaces may be exposed by the APIs to devices (e.g., management consoles, desktop computers, mobile devices) operated by such users. For example, as further described herein, the user interfaces may allow an operator to manage the dynamic generation of narrative content data to be mapped to data objects on the platform 102 (e.g., such as data objects corresponding to bettable events).

In some embodiments, the platform 102 (and services provided by the platform 102) may be implemented as a microservice architecture on a virtual machine or container-based cluster infrastructure in which discrete services are deployed and executed independently to manage various functions of the platform (e.g., bet selection, odds calculation, account management, payment processing, social features, and the like). The infrastructure may provide components for deploying, scaling, and managing microservices and workloads. For example, the platform 102 may be implemented using a public open source cluster architecture such as Kubernetes. Other examples include, but are not limited to, Docker, Amazon ECS, and Azure Container Instances. Of course, one of skill in the art will recognize that the platform 102 may also be implemented using other types of software architectures, such as monolithic architectures, modular or layered architectures, and so on.

Figure 2:
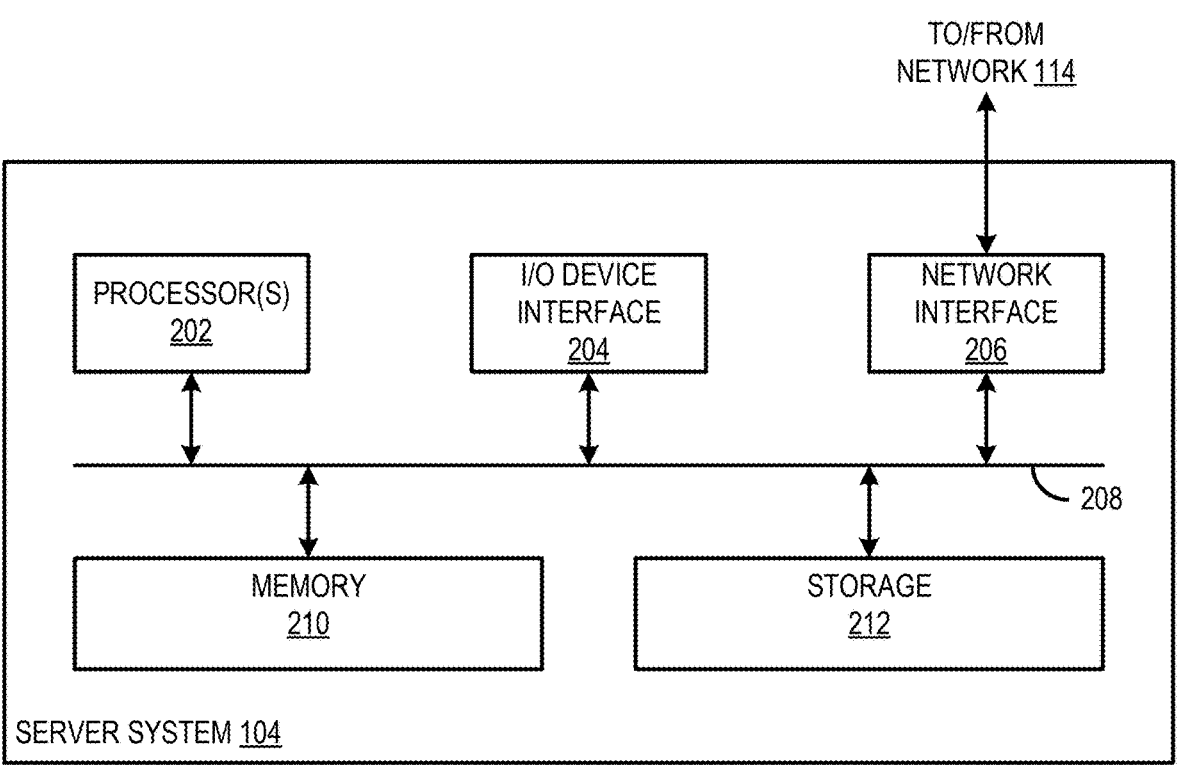
FIG. 2 illustrates components of an example server system of the online sportsbook platform of FIG. 1, according to an embodiment.

Turning briefly to FIG. 2, a block diagram further illustrating hardware and software components of an example server system 104 is shown. As shown, the server system 104 includes, without limitation, one or more processors 202, an I/O device interface 204, a network interface 206, a memory 210, and a storage 212, each interconnected via a hardware bus 208. Of course, the actual server system 104 will include a variety of additional hardware (or software-based) components not shown. Additionally, in some embodiments, one or more of the illustrative components may be incorporated in, or otherwise form a portion of, another component.

The processor 202 retrieves and executes programming instructions stored in the memory 210 capable of performing the functions described herein. The processor 202 may be embodied as a single or multi-core processor(s), a graphics processor, a microcontroller, or other processor or processing/controlling circuit. In some embodiments, the processor 202 may be embodied as, include, or be coupled to a field programmable gate array (FPGA), an application-specific integrated circuit (ASIC), reconfigurable hardware or hardware circuitry, or other specialized hardware to enable performance of the functions described herein. The hardware bus 208 is used to transmit instructions and data between the processor 202, storage 212, network interface 206, and the memory 210. The memory 210 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

The network interface 206 may be embodied as any hardware, software, or circuitry (e.g., a network interface card) used to connect the server system 104 over the network 114 and providing the network communication component functions described above. For example, the network interface 206 may be embodied as any communication circuit, device, or collection thereof, capable of enabling communications over the network 114 between the server system 104 and other devices. The network interface 206 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication. For example, to do so, the network interface 206 may include a network interface controller (NIC, not shown), embodied as one or more add-in-boards, daughtercards, controller chips, chipsets, or other devices that may be used by the server system 104 for network communications with remote devices (e.g., the client devices 108). For example, the NIC may be embodied as an expansion card coupled to the I/O device interface 204 over an expansion bus such as PCI Express.

The I/O device interface 204 allows I/O devices to communicate with hardware and software components of the server system 104. For example, the I/O device interface 204 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O device interface 204 may form a portion of a system-on-a-chip (SoC) and be incorporated, along with one or more of the CPU/GPU 202, the memory 210, and other components of the server system 104.

The I/O devices (not shown) may be embodied as any type of I/O device connected with or provided as a component to the server system 104, such as keyboards, mice, and printers. In an embodiment, the server system 104 may execute an instance of the platform application 106 (or one or more microservices associated with the platform application 106, such as artificial intelligence and machine learning (AI/ML)-based engines for analyzing public sentiment associated with a given bettable event and generating narrative content data and structures based on the same).

The storage 212 may be embodied as any type of device configured for short-term or long-term storage of data such as, for example, memory devices and circuits, memory cards, hard disk drives (HDDs), solid-state drives (SSDs), or other data storage devices. The storage 212 may include a system partition that stores data and firmware code for the storage 212. The storage 212 may also include an operating system partition that stores data files and executables for an operating system. For example, the storage 212 may store AI/ML models and training data used in analyzing public sentiment associated with a given bettable event and generating narrative content data and structures based on the same.

Figure 3:
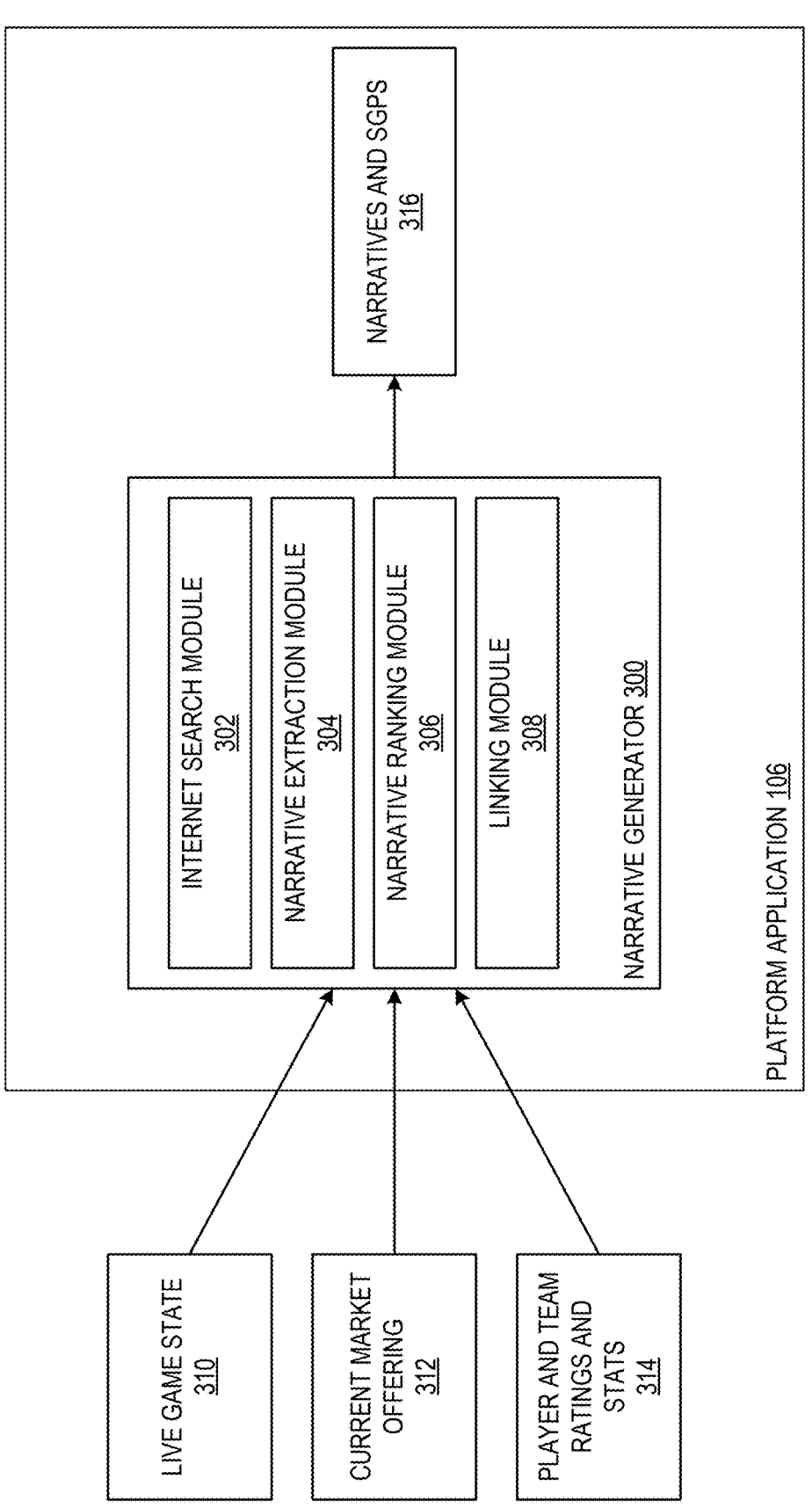
FIG. 3 illustrates a conceptual block diagram of an example operational environment for a narrative generator configured to dynamically build narrative content and structures associated with an event object, according to an embodiment.

Referring now to FIG. 3, a conceptual operational diagram depicting a narrative generator 300 executing on the platform application 106 to analyze various sources relating to an upcoming or live bettable event and create (and/or extract) relevant narratives is shown. As shown, the narrative generator 300 may include subcomponents such as an internet search module 302, a narrative extraction module 304, a narrative ranking module 306, and a linking module 308. Each of the subcomponents 302, 304, 306, and 308 may execute on a single instance of the platform application 106 or on separate instances. For example, the internet search module 302 may perform operations as a microservice of the platform application 106 executing on a given cluster node while the narrative extraction module 304 performs operations as a microservice executing on another cluster node on the platform 102. In an embodiment, the platform 102 may orchestrate resources (e.g., computer node resources, network resources, storage resources) to ensure that the narrative generator 300 executes under an optimal performance configuration.

Further, each of the components 302, 304, 306, and 308 may incorporate one or more AI/ML models in operation. For example, the narrative generator 300 (or other component or service executing on the platform 102) may implement and train one or more large language models (LLMs) to perform functions that are further disclosed herein. Other examples of LLMs that the narrative generator 300 (or other component or service of the platform 102) may use OpenAI LLMs (e.g., GPT-4, GPT-5, InstructGPT), Claude, Gemini, LLaMA, FLAN-T5, etc.

The illustrative internet search module 302 may be embodied as any hardware, software, and/or circuitry configured to obtain information relevant to an upcoming or bettable event. In an embodiment, the internet search module 302 may incorporate one or more large language models (LLMs) to formulate queries for various internal and external information sources based on fixture data associated with a given event. Internal information sources can include scheduling APIs, platform social media APIs, bet APIs, simulated odds APIs, historical data APIs, news service APIs, and the like. External information sources can include third-party search engines, news outlet websites, sports media websites, social media, crowdsourcing websites, social news aggregation and forum social media platforms, broadcasts, broadcast transcripts, online message boards, and the like. Fixture data can include live game state 310

(e.g., current score, time remaining, current period, possession indicator, scoring events, fouls and penalties, timeouts, scheduling data, weather changes, etc.), current market offering 312 (e.g., betting market availability, status, odds, constraints, etc.), and player and team ratings and stats 314 (e.g., player performance and statistics, team-level performance and statistics, overall ratings, standings in league table, performance in the last specified amount of games, historical matchup data, home and away splits, player ratings, expected stat lines, analytics data, etc.). In an embodiment, the internet search module 302 may tailor queries and prompts based on the information source being queried. For example, the internet search module 302 may generate human-readable prompts for sources that receive such prompts as input. As another examples, the internet search module 302 may also formulate API queries for API sources.

The queries and prompts generated by the internet search module 302 are configured to elicit relevant information about an upcoming or live event. Example information can include public sentiment surrounding associated aspects of the event (e.g., teams, players, statistics, etc.), ongoing narratives in news articles about teams or players (or other contestant) relating to the event, team statistics, current markets, live game sentiment, etc.

The illustrative narrative extraction module 304 may be embodied as any hardware, software, and/or circuitry configured to analyze and identify narrative elements in the information obtained by the internet search module 302. The narrative extraction module 304 may incorporate AI/ML techniques to perform sentiment analysis on text-based content returned by the internet search module 302 to identify sentiments, such as whether certain text corresponds to positive sentiment, negative sentiment, neutral sentiment, and other more granular categories of sentiment. Doing so allows the narrative extraction module 304 to identify narrative elements (e.g., main themes and/or theses, key entities such as people, players, places, temas, etc.), relationships, events, historical context, etc.) that may be perceived as relevant and compelling from a gambling and user engagement perspective. In an embodiment, the LLMs used by the narrative extraction module 304 may be trained on data provided by the aforementioned internal and external sources which have been previously annotated for certain sentiments and other classifications.

In an embodiment, the narrative extraction module 304 uses AI/ML techniques to generate and/or extract narrative content from the identified narrative elements. For example, the narrative extraction module 304 may generate content data incorporates a setup, key developments, and implications for a given event. The narrative extraction module 304 may also use the AI/ML techniques to include stylistic tones to increase potential of the narrative content being compelling to the user.

The illustrative narrative ranking module 306 may be embodied as any hardware, software, and/or circuitry configured to score and rank output from the narrative extraction module 304. The scoring may be based on training data and annotations that weight certain narratives over others based on predefined criteria, such as criteria that indicate that the narrative is relevant from a gambling and user engagement perspective. The criteria may include proximity of the text to previous bet narratives, proximity of the text to previous bet narratives that exceed a specified threshold of user engagement, use of certain language correlative to higher user engagement with the platform 102, and so on. The scoring and weighting mechanisms may be incorporated in the underlying AI/ML models and trained based on the predefined criteria (e.g., in which certain narratives such as content data that identifies key narrative hooks such as rivalries and momentum are to be weighted over other content such as narratives that focus on commemorative milestones).

The illustrative linking module 308 may be embodied as any hardware, software, and/or circuitry configured to map generated narrative data to a respective bet type object, such as a SGP object generated in response to the creation of the narrative content. In some embodiments, the linking module 308 may directly embed narrative content to the bet type object (e.g., in which the bet type object implements one or more additional data fields for entering the narrative content). The linking module 308 may maintain mappings on the platform 102 (e.g., in a storage such as a. The narrative generator 300 may output narratives and SGPs 316 for distribution by backend processes to frontend interfaces, such as a GUI of the app 110 (or web interface on the browser application 112). Narratives and SGPs 316 may also be stored on the platform 102 (e.g., in storage 212). Of course, because bet type objects can be generalized to other bet types beyond SGPs, the narrative generator 300, may also output content to associate with other bet type objects in addition to (or in the alternative of) SGPs.

Figure 4:
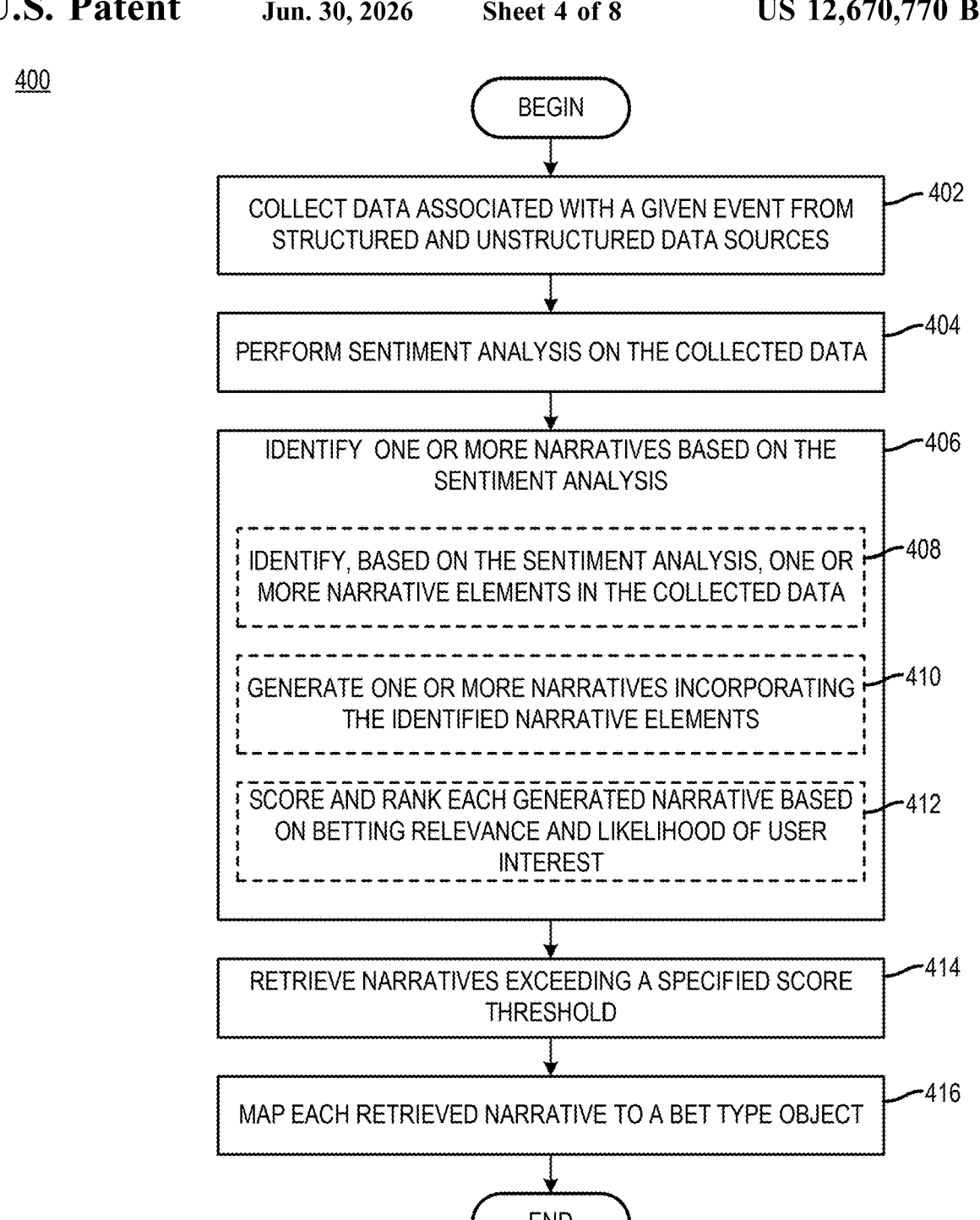
FIG. 4 illustrates a flow diagram of an example method for generating narrative content and structures associated with an event object, according to an embodiment.

Referring now to FIG. 4, platform application 106, in operation, may perform a method 400 for dynamically generating narrative content and structures associated with an identifiable event, according to an embodiment. The platform application 106 may perform the method 400 via one or more components, including the narrative generator 300 described herein. One of skill in the art will recognize that steps of the method 400 need not be performed in the exact order illustrated or described. Rather, the steps may be performed in any order that achieves the same or similar functionality. Further, the platform application 106 may perform one or more of the steps simultaneously, in parallel, or can omit one or more of the steps, depending on the implementation.

As shown, the method 400 begins in block 402, in which the platform application 106 collects data associated with a given event from structured and unstructured data sources. Particularly, the platform application 106 retrieves information relevant to an event by formulating one or more queries to enter to the data sources. To do so, the platform application 106 may employ AI/ML techniques via LLMs executing on the platform 102. For example, the user may define loose descriptions that can be used to generate related queries, such as "What's going on with the New York and Detroit baseball game?" or "What games are occurring this week." The LLM may interpret each user-provided query and generate structured queries that can be subsequently input to the data sources. In an embodiment, the LLM may identify relevant entities (e.g., team names, players, locations, scheduling, etc.) and events to create more targeted queries. As a result, the platform application 106 can obtain data relevant to the event.

In block 404, the platform application 106 performs, using AI/ML techniques (e.g., via a LLM) sentiment analysis on the collected data. The platform application 106 may ingest and text from the resulting data and perform natural language processing to parse and understand semantic contexts such as word choice and tone. For instance, in block 406, the platform application 106 identifies one or more narrative elements based on the natural language processing. In block 408, the platform application 106 identifies, based on the sentiment analysis, one or more narrative elements in the collected data. For example, the platform application 106 may identify (e.g., using the LLM) entities, actions within the event, themes, and so on. In block 410, the platform application 106 generates (and/or extracts) one or more narratives incorporating the identified narrative elements. Using AI/ML techniques, the platform application 106 may formulate a structured narrative that includes, e.g., a title, description incorporating identified themes and sentiment, implications suggested by the description, and the like. In block 412, the platform application 106 scores and ranks each generated (and/or extracted) narrative based on betting relevance and likelihood of user interest. In block 414, the platform application 106 retrieves narratives exceeding a specified score threshold. In an embodiment, the narratives that exceed the threshold may be used for association with a bet type object and availed to a client-side frontend interface of the platform 102.

In block 416, the platform application 106 maps each retrieved narrative to a data object, such as a bet type object. In some embodiments, the bet type object may have a field for inserting the generated narrative, and the platform application 106 may instead (or in addition to the mapping) enter the narrative into the bet type object. In some embodiments, the narratives and mappings may be used to train or refine the LLMs used in operation of the narrative generator 300. For example, manual review of the generated narratives may be performed to determine which generated narratives are suitable for publishing to the platform 102 and which of the generated narratives are not. Users may rank or label preferred narratives, and the feedback sent by the users may then be transmitted to the LLMs, which in turn may use reinforcement learning to adjust weightings in scoring mechanisms. As another example, the queries and narratives generated by the models used by the narrative generator 300 may be used to generate new training data such as paraphrased queries and narratives.

The bet type objects incorporating the narrative content objects may be published on the platform 102 for retrieval by a client app 110. For example, the platform 102 may expose the bet type objects via an API invokable by the client app 110. The client app 110 may render the bet type object for display on the respective client device 108.

The method 400 may be adapted to update narrative content objects and betting objects in real-time based on new information, such as contemporaneous developments during an ongoing sports event, such as a comeback by a team later in the game. In such cases, for instance, the platform application 106 may extract and rank new narrative element from internal and external sources, identify updates to previously incorporated narrative elements, and generate new (or modify pre-existing) narrative objects incorporating the updates. The new or modified narrative objects can then be mapped to a new bet type object having updated odds and/or legs (or replace or supplement an existing bet type object). The platform 102 may thereafter avail the new (or updated) bet type object incorporating the updated narrative content object for retrieval (e.g., via an API) and presentation by the client device 108.

Figure 5B:
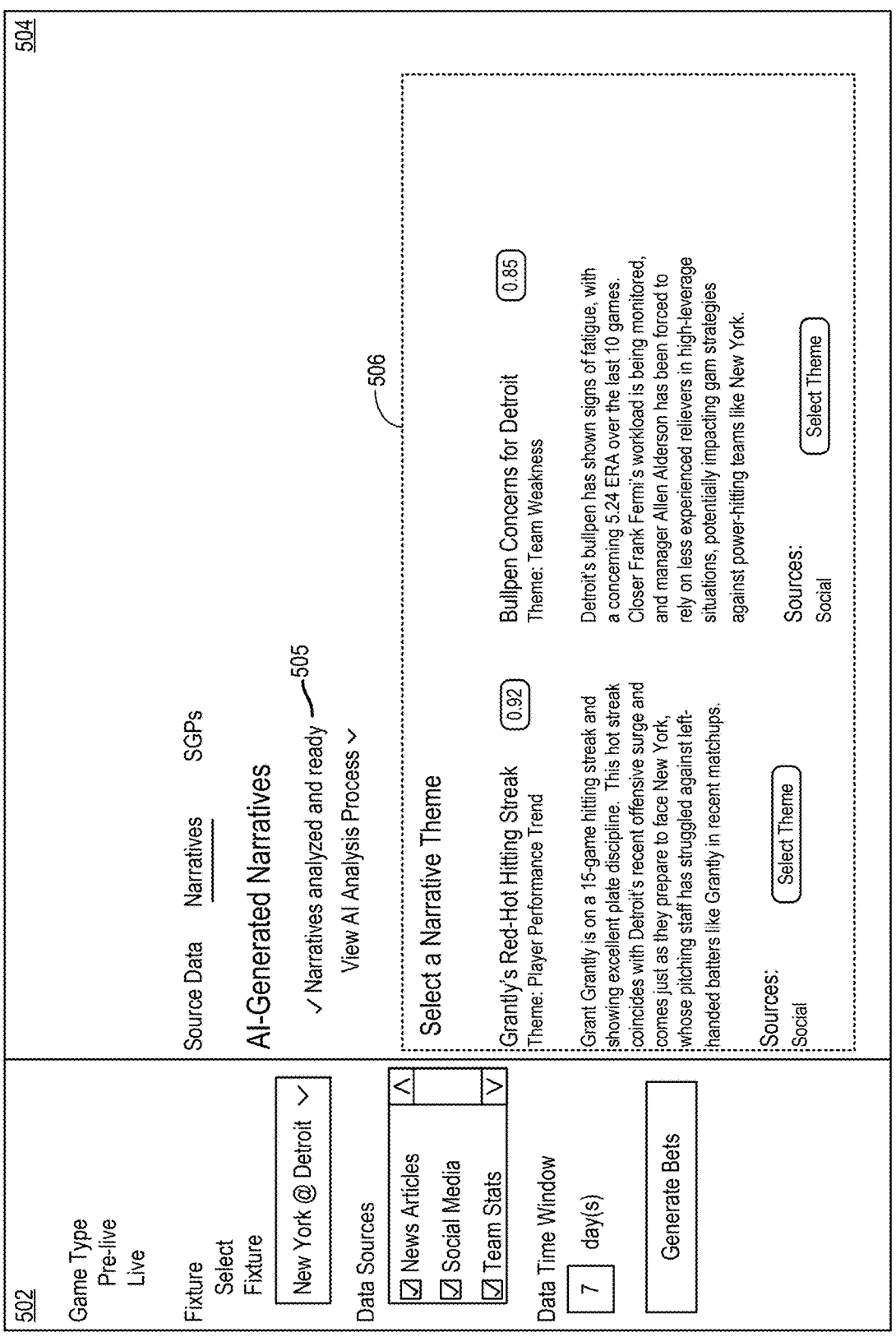
Figure 5C:
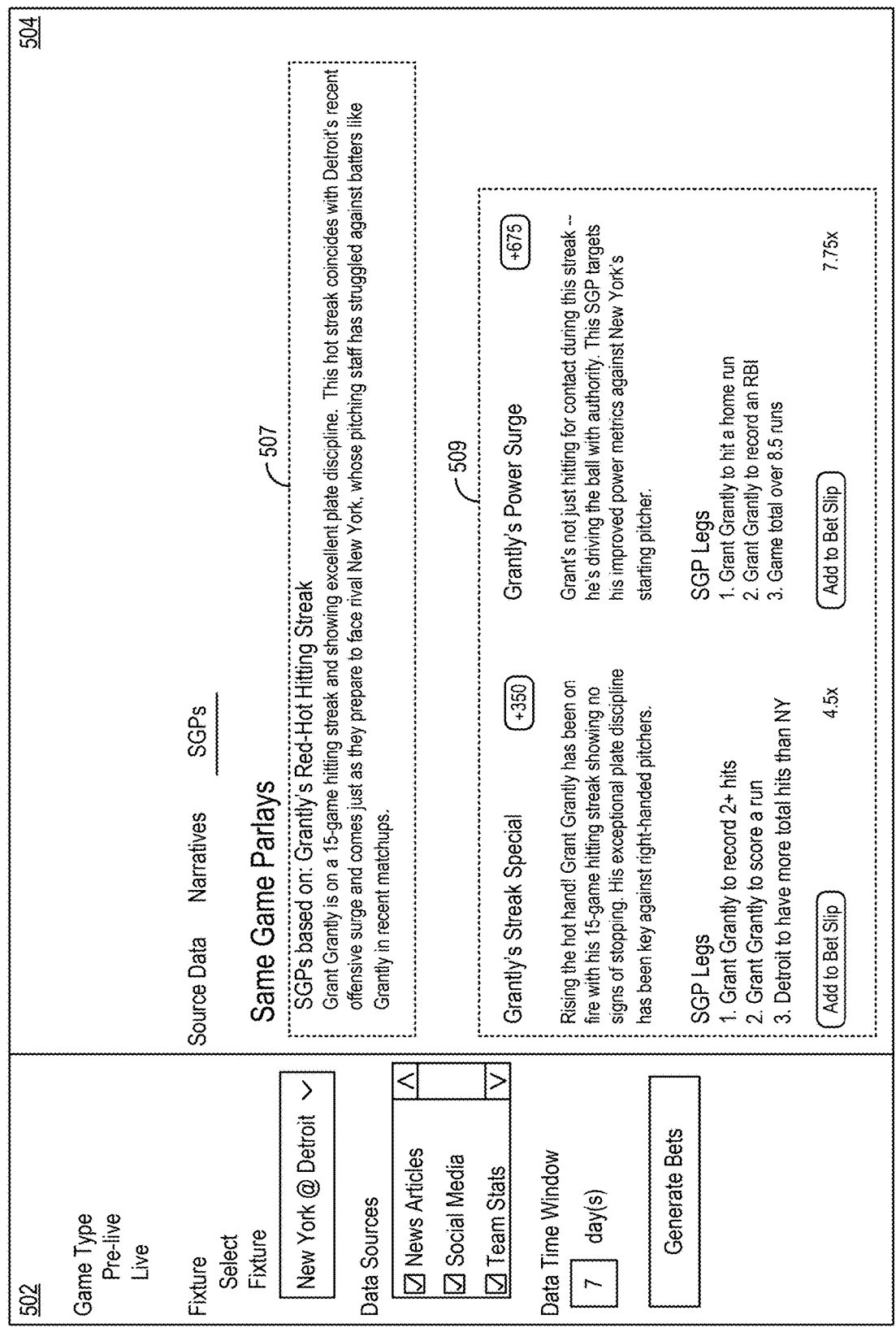

In an embodiment, the platform application 106 may expose a user interface to an internal user, such as an operator user tasked with reviewing and publishing narrative data for an event. FIGS. 5A-5C illustrate an example of such a user interface 500 in which the user may configure parameters for generating a narrative and selecting from relevant and timely narratives to publish for SGP bet type objects on the platform 102. Of course, the user interface 500 may be adapted to other bet type objects such as individual bets, multi-event parlay bets, and the like. The left-hand sidebar 502 of FIGS. 5A-5C provide a menu of customizable settings for a given fixture (the list of which can be pulled from an internal platform 102 API, such as an API for scheduled event data) and an option to generate and publish resulting bet objects from generated narratives. Illustratively, the sidebar 502 includes options for selecting a game type (whether pre-live or live), a fixture, data sources from which to extract relevant information and sentiment (which can incorporate data sources such as the ones previously discussed), and a data time recency window. The sidebar 502 also includes a button for generating (or publishing) the narrative for the associated fixture. The right-hand pane 506 of FIG. 6A provides a navigation ribbon allowing the user to toggle between a Source Data page, Narratives page, and SGPs page. The following example shows information relating to a fixture event for "New York @Detroit."

FIG. 5A shows a Source Data page display in the right-hand pane 504, which allows the user to view information pulled from the selected data sources. In this example, for simple purposes of illustrating the inventive concepts at hand, at least "News Articles," "Social Media," and "Team Stats" have been selected in the sidebar 502. The Source Data page display provides a ribbon for views of the selected data sources. FIG. 5A shows a view for Team Stats, which corresponds to data pulled from sources that provide statistics for each team, in which the data can include, as shown, outcomes of recent games played by each team, outcomes of head-to-head games, and conference standings. The display allows a user to view what data sources and source data was used in generating possible narratives for associating with the underlying event.

FIG. 5B shows a Narratives display in the right-hand pane 604, which allows the user to view and select narratives created by the narrative generator 300. As shown, the display presents an element 505 indicating the status and process details of the data source analysis. As further shown, the display also presents an element 606 for selecting narrative themes. In this example, the element 506 displays two options for narrative theme selection. Each option displays a title (e.g. Grantly's Red-Hot Hitting Streak" and "Bullpen Concerns for Detroit"), a scoring output by the narrative generator 300 indicating a measure of betting relevance and potential for user interest (e.g., "0.92" and "0.85"), a detailed content description (e.g., "Grant Grantly is on a 15-game hitting streak . . . " and "Detroit's Bullpen has shown signs of fatigue . . . "), sources relied on by the narrative generator 300 to create the content, and a selection button element.

FIG. 5C shows a SGPs display in the right-hand pane 504, which shows a preview of a bet slips based on a selected SGP narrative, which includes elements 505 and 509. Element 507 shows the title of the selected SGP narrative ("Grantly's Red-Hot Hitting Streak") and associated content description. Element 509 lists previews of the generated SGP slips. The illustrative previews include two bet slips, which each include a title (e.g., "Grantly's Streak Special" and "Grantly's Power Surge"), odds (e.g., "0.92" and "0.85"), theme (e.g., "Player Performance Trend" and "Team Weakness"), detailed content description (e.g., "Rising the hot hand! Grant Grantly has been on fire with his 15-game hitting streak . . . " and "Grant's not just hitting for contact during this streak—he's driving the ball with authority."), SGP legs, bet multiplier (e.g., "4.5×" and "7.75×"), and button for a user to add the SGP to a bet slip. In other examples that might involve bets other than SGPs, aspects of the display shown in the right-hand page 504 may differ based on the type of bet. For instance, in the case of single bets, the display might retain a title, odds, theme, detailed content description, but might omit other elements such as parlay legs.

Figure 6:
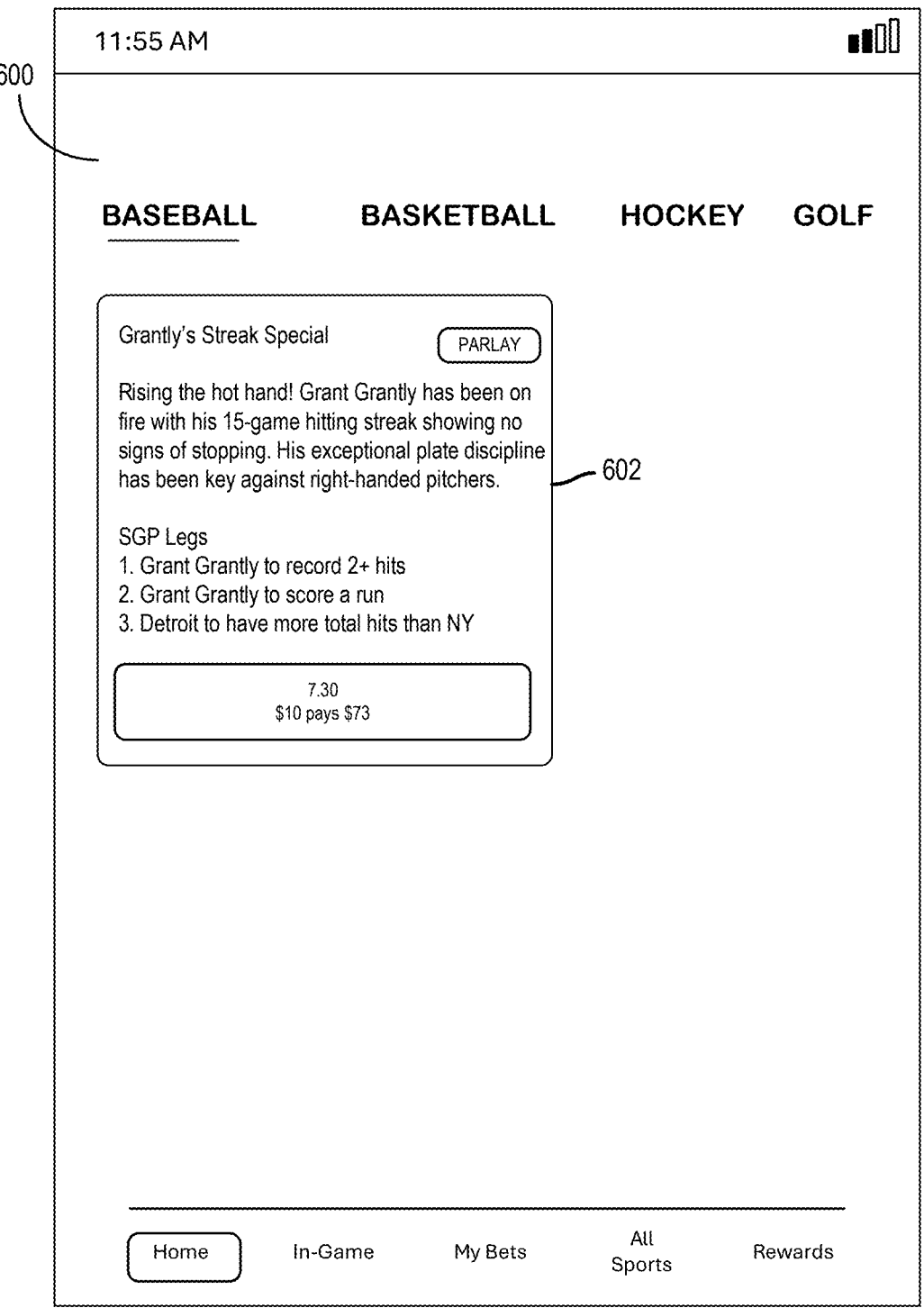
FIG. 6 illustrates a user interface of a client-side application displaying generated content associated with an event, according to an embodiment.

Generating the bet objects via the user interface causes the platform application 106 to avail the bet objects to backend processes of the platform 102, which can then be distributed to bettor users of the platform 102. The backend may expose the bet objects via an API (e.g., REST API), which the client device (e.g., client device 108) can retrieve via a request. The platform application 106 may respond with a structured payload that provides the bet object for display. Referring now to FIG. 6, an example GUI 600 for a client-side application (e.g., app 110 or a web interface on browser application 112) is shown to include a published SGP bet type object that incorporates the generated narrative selected from the user interface 500 of FIGS. 5A-5C. GUI 600 includes a graphical element 602 that is indicative of the published SGP bet type object labeled "Grantly's Streak Special."

For the purposes of promoting an understanding of the principles of the present disclosure, reference is made herein to preferred embodiments and specific language is used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical terms used herein have the same meaning as commonly understood by one of ordinary skill in the art to which this disclosure belongs.

Another aspect of the present disclosure is a system. The system can be implemented in hardware, software, firmware, or combinations of hardware, software and/or firmware. In some examples, the system and methods described in this specification may be implemented using a non-transitory computer readable medium storing computer executable instructions that when executed by one or more processors of a computer cause the computer to perform operations.

Another aspect of the present disclosure provides all that is described and illustrated herein.

One skilled in the art will readily appreciate that the present disclosure is well adapted to carry out the objects and obtain the ends and advantages mentioned, as well as those inherent therein. The embodiments of the present disclosure described herein are presently representative of preferred embodiments, are examples, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The invention claimed is:

1. A system comprising:
one or more processors; and
a memory storing a plurality of instructions, which, when executed on the one or more processors, cause the system to:
retrieve, via one or more application programming interfaces (APIs) of an online sportsbook platform, event state data associated with a bettable event from a plurality of structured and unstructured data sources,
generate, using one or more artificial intelligence and machine learning (AI/ML) models, a plurality of structured text queries based on the event state data,
collect text-based data associated with the bettable event from a plurality of data sources using the plurality of structured text queries,
identify, based on an analysis of the collected text-based data using the one or more AI/ML models, one or more narrative elements associated with the bettable event,
generate, using the one or more AI/ML models, one or more narrative content objects stored in a narrative object data structure and incorporating the identified narrative elements,
associate each of the one or more narrative content objects with a bet type object representing a wagering opportunity within an online sportsbook platform,
receive, from the plurality of data sources and while the bettable event is occurring, additional text-based data associated with the bettable event,
identify, based on an analysis of the additional text-based data using the one or more AI/ML models, one or more updates to the incorporated narrative elements,
modify, while the bettable event is occurring, the narrative content object data structure in real-time based on the one or more updates to generate updated narrative content objects; and
transmit the updated narrative content objects with the associated bet type objects to a client device for display within a graphical user interface of the online sportsbook platform.

2. The system of claim 1, wherein the plurality of instructions further causes the system to score each generated narrative content object based on a betting relevance and likelihood of user interest.

3. The system of claim 2, wherein to associate each of the one or more narrative content objects comprises to map narrative content objects exceeding a specified threshold to the bet type object.

4. The system of claim 1, wherein the plurality of instructions further causes the system to score each generated narrative content object based on a betting relevance and likelihood of user interest.

5. The system of claim 1, wherein the plurality of instructions further causes the system to map each of the one or more narrative content objects to a same game parlay bet type object.

6. The system of claim 1, wherein to associate each of the one or more narrative content objects comprises to map each of the one or more narrative content objects to the bet type object to avail to a frontend interface of the online sportsbook platform.

7. The system of claim 1, wherein to generate the plurality of structured text queries based on the event state data comprises to generate, using the one or more AI/ML models, one or more text-based queries for input to at least one of a news media website, social media aggregator, sports news outlet website, or a historical data source based on the event state data.

8. The system of claim 1, wherein the one or more AI/ML models comprises one or more large language models (LLMs) configured to perform sentiment analysis and entity extraction on the collected text-based data.

9. The system of claim 8, wherein the plurality of instructions further causes the system to refine the LLMs based on the one or more narrative content objects.

10. A method comprising:
retrieving, by execution of one or more processors and via one or more application programming interfaces (APIs) of an online sportsbook platform, event state data associated with a bettable event from a plurality of structured and unstructured data sources;
generating, by execution of the one or more processors and using one or more artificial intelligence and machine learning (AI/ML) models, a plurality of structured text queries based on the event state data;
collecting, by execution of one or more processors, text-based data associated with the bettable event from a plurality of data sources using the plurality of structured text queries;
identifying, by execution of the one or more processors and based on an analysis of the collected text-based data using the one or more AI/ML models, one or more narrative elements in the collected data;
generating, by execution of the one or more processors and using the one or more AI/ML models, one or more narrative content objects stored in a narrative object data structure incorporating the identified narrative elements;
associating, by execution of the one or more processors, each of the one or more narrative content objects with a bet type object representing a wagering opportunity within for an online sportsbook platform;
receiving, from the plurality of data sources and while the bettable event is occurring, additional text-based data associated with the bettable event;

identifying based on an analysis of the additional text-based data using the one or more AI/ML models, one or more updates to the incorporated narrative elements;

modifying, while the bettable event is occurring, the narrative content object data structure in real-time based on the one or more updates to generate updated narrative content objects; and transmitting, by execution of the one or more processors, the updated narrative content objects with the associated bet type objects to a client device for display within a graphical user interface of the online sportsbook platform.

11. The method of claim 10, further comprising, scoring, by execution of the one or more processors, each generated narrative content object based on a betting relevance and likelihood of user interest.

12. The method of claim 11, wherein associating each of the one or more narrative content objects comprises mapping narrative content objects exceeding a specified threshold to the bet type object.

13. The method of claim 10, further comprising, scoring, by execution of the one or more processors, each generated narrative content object based on a betting relevance and likelihood of user interest.

14. The method of claim 10, further comprising, mapping, by execution of the one or more processors, each of the one or more narrative content objects to a same game parlay bet type object.

15. The method of claim 10, wherein associating each of the one or more narrative content objects comprises mapping each of the one or more narrative content objects to the bet type object to avail to a frontend interface of the online sportsbook platform.

16. The method of claim 10, wherein generating the plurality of structured text queries based on the event state data comprises generating, using the one or more AI/ML models, one or more text-based queries for input to at least one of a news media website, social media aggregator, sports news outlet website, or a historical data source based on the event state data.

17. The method of claim 10, wherein the one or more AI/ML models comprises one or more large language models (LLMs) configured to perform sentiment analysis and entity extraction on the collected text-based data.

18. The method of claim 17, further comprising, refining, by execution of the one or more processors, the LLMs based on the one or more narrative content objects.

\* \* \* \* \*